D. R. RICHIE.
CULTIVATOR.
APPLICATION FILED OCT. 29, 1920.
1,406,417.  Patented Feb. 14, 1922.
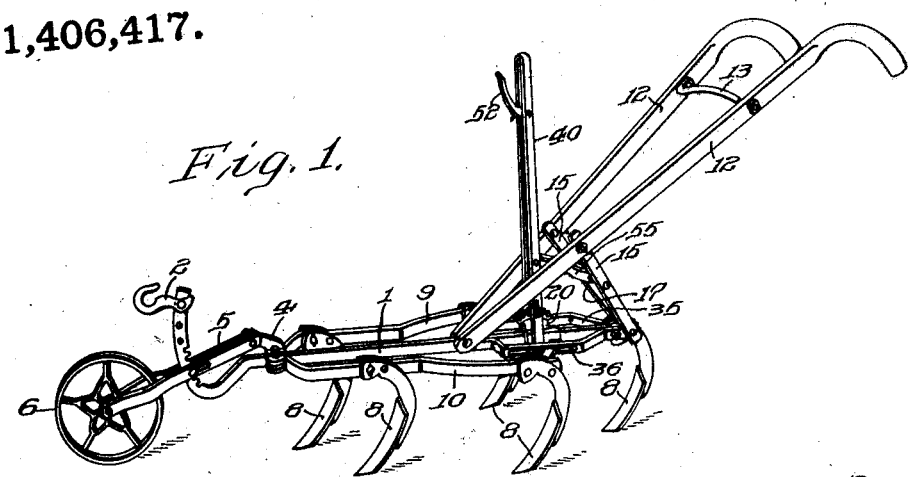
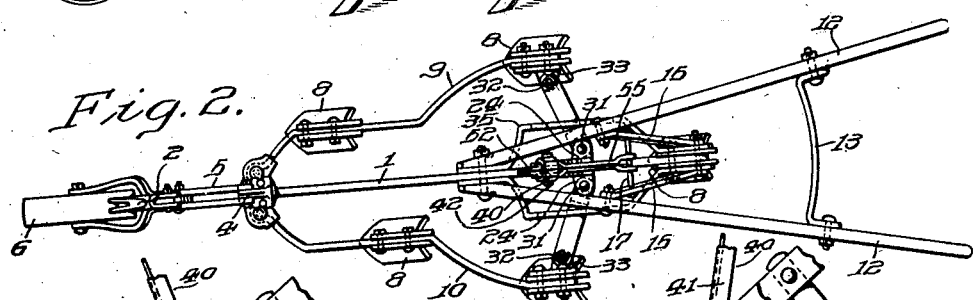
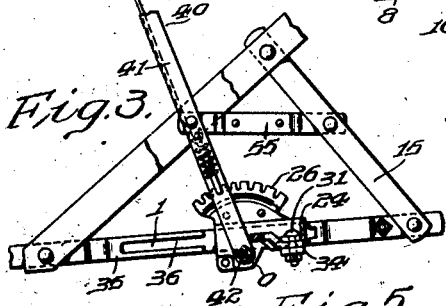
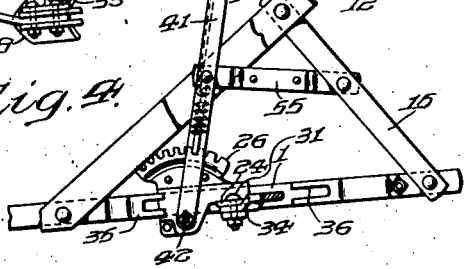
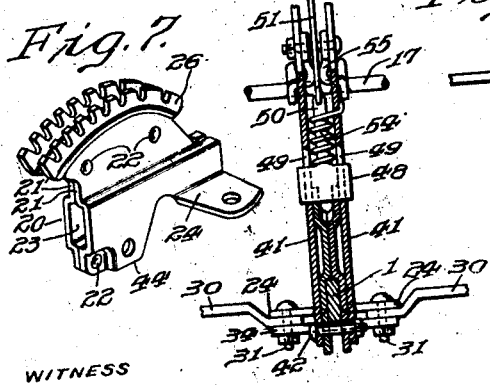
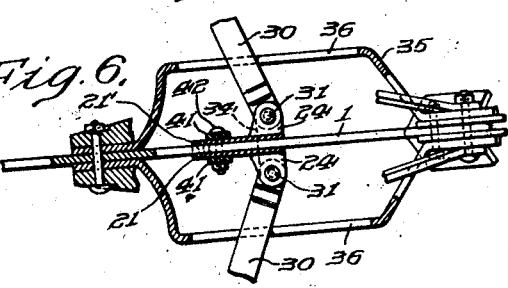
INVENTOR
David R. Richie

UNITED STATES PATENT OFFICE.

DAVID R. RICHIE, OF LANSDOWNE, PENNSYLVANIA, ASSIGNOR TO S. L. ALLEN & CO., INC., A CORPORATION OF PENNSYLVANIA.

CULTIVATOR.

1,406,417.

Specification of Letters Patent. Patented Feb. 14, 1922.

Application filed October 29, 1920. Serial No. 420,333.

*To all whom it may concern:*

Be it known that I, DAVID R. RICHIE, a citizen of the United States, and a resident of Lansdowne, county of Delaware, and State of Pennsylvania, have invented certain new and useful Improvements in Cultivators, of which the following is a specification, reference being had to the accompanying drawing.

My invention relates to that class of cultivators which comprise a central or middle bar and side bars movably connected thereto which are adjustable toward and away from the middle bar for the purpose of varying the relative position of the ground working tools to adapt the implement for cultivating rows of plants spaced at different widths.

A principal object of my invention is the provision of means in a cultivator of this general character for conveniently effecting simultaneous adjustment of the side bars by the manual operation of a single lever, and to so construct and arrange the various parts of the cultivator that the side bars may be held securely in any desired adjusted position.

My invention further comprehends the design and positioning of the various parts in such manner that the cultivator as a whole is extremely rigid and without lost motion or looseness between the various elements which if present would interfere with the satisfactory and effective use of the implement.

A further object of my invention is to provide a cultivator having the foregoing characteristics which is simple in design and construction, comprises but a relatively small number of parts, is not liable to get out of order or be damaged when subjected to hard usage and in which the adjustment of the side bars may be readily effected independent of whether the ground working tools are engaged in or withdrawn from the soil.

My invention further comprises all of the other various objects and novel features of construction and arrangement hereinafter more definitely specified and described.

While in carrying out my invention I may employ any instrumentalities or combinations thereof which are effective for performing the desired objects and functions, I have, in the accompanying drawing, illustrated, and will now proceed to describe for the purpose of enabling those skilled in the art to practise the invention, a preferred embodiment of means suitable for that purpose.

In the drawing, Fig. 1 is a perspective view of a cultivator embodying a preferred form of my invention; Fig. 2 is a top plan view thereof; Figs. 3 and 4 are fragmentary enlarged detail views in side elevation with portions broken away for the sake of clearness, showing certain of the parts in different positions of adjustment; Fig. 5 is a fragmentary, still further enlarged detail view through the operating lever partially in vertical section; Fig. 6 is a fragmentary plan view partially in horizontal section showing a portion of the middle bar and certain of its adjacent parts and Fig. 7 is an enlarged perspective view of the sliding member removed from the middle bar. Like numerals are used to designate similar parts in the several figures.

The cultivator shown in the drawing comprises a longitudinally extending middle bar 1 which is curved upwardly at its forward end and provided with a hook 2 for the attachment of the draft gear. To a clip 4, secured adjacent the forward end of the middle bar, is pivoted a forwardly extending fork 5 which supports the axle of the land wheel 6, the fork being preferably arranged for adjustable support on the curved part of the middle bar to permit the land wheel to be raised and lowered to vary the depth of the cut of the ground working tools 8 supported on each of the side bars 9 and 10, an additional tool also being preferably supported adjacent the rear end of the middle bar. The forward ends of the side bars are preferably hinged to or otherwise supported by the clip 4 in such manner that the bars are capable of movement to and from the middle bar, each of the side bars being preferably zig-zagged outwardly and rearwardly so that its rearmost extremity is normally considerably further from the middle bar than its forward end. It will be understood, however, that the specific arrangement and construction of the parts hitherto described may be varied as desired, as the same are well known to the art and form no part of the present invention.

Extending upwardly and rearwardly from the middle bar and rigidly secured thereto in any suitable manner are a pair of preferably diverging handle bars 12 connected by a brace 13, and for the purpose of strengthening the construction, a strut 15 is preferably arranged to extend from each handle bar, downwardly, inwardly and rearwardly to the extremity of the middle bar to which it is secured in any suitable manner. These struts are preferably connected by a transversely extending brace rod 17.

The middle bar is conveniently of rectangular section and serves to slidably support the sliding member 20, best shown in Fig. 7, which may preferably comprise a pair of complementary plates 21—21' secured together by rivets 22 so as to form a unitary whole. These plates are preferably formed in suitable dies in such manner that when assembled they provide a longitudinally extending, substantially rectangular central aperture 23 of a size to form a good working fit on the middle bar, the material of the plates both above and below the portions thereof which form the aperture being bent inwardly so that when the plates are assembled, these inwardly bent portions present surfaces for mutual contact. A portion of each plate is also bent outwardly substantially normal to the body of the plate to form an ear 24, while the extreme upper portion of each plate is preferably outwardly offset and provided with the rack teeth so that when the plates are assembled the upper extremity of the member 20 provides a curved rack 26 having spaced sides formed by the laterally offset upper portions of the plates, the curvature of the rack preferably being that of an arc struck from the center O which is preferably slightly below the lower edge of the middle bar and substantially equidistant from the ends of the rack, and upon which the operating lever, hereinafter referred to, is pivoted.

Each of the ears 24 on the member 20 is connected with the adjacent side bar by an arm 30 preferably made of flat bar stock and pivoted at its inner end to the ear by a suitable pivot bolt 31 and at its outer end, by a suitable pivot bolt 32, to a lug 33 carried by the side bar. The lower ends of the pivot bolts 31 may preferably be connected by a transversely extending plate 34 which passes beneath the middle bar and preferably is in sliding contact therewith or very slightly spaced therefrom. This plate, when the member is moved along the middle bar, as hereinafter described, serves to assist in keeping the member in proper position with respect thereto by affording a firm bearing on the under side of the middle bar adjacent the rear portion of the member.

On each side of the middle bar a guide 35 is preferably provided through which the adjacent arm 30 is arranged to extend. These guides which are preferably made from flat bar stock, have their ends bolted to the middle bar and their central portions laterally offset and provided with a longitudinally extending slot 36 for the reception of the arm 30, which is positioned with its greatest width in the horizontal plane, so that, through contact with the sides of the slot, the arms are prevented from turning, thus minimizing the strain on the pivot bolts at the ends of the arms and enhancing the rigidity of the whole structure, as well as keeping the side bars in horizontal alignment with the middle bar at all times.

For the purpose of moving the sliding member 20 along the middle bar and thus moving the side bars in and out therefrom by varying the angularity of the arms 30 with the middle bar, suitable manually operable means are provided which may preferably comprise a hand lever 40 pivoted on the sliding member and movable both with the sliding member and relatively thereto, the operating position of the lever with respect to the member being controlled by suitable latching mechanism cooperative with the rack 26. While the lever may be of any suitable design, it is preferably formed from a single flat bar which is doubled over on itself at its center, which forms the upper extremity of the lever, and thus provides a pair of spaced side members 41 which extend downwardly on each side of the member 20 and are secured thereto by the pivot bolt 42 which passes through them and a depending lug 44 formed on each of the plates 21—21' adjacent the point O with which the pivot bolt is concentric. For holding the lever 40 in adjusted relation with the member 20 suitable latching means are provided which may preferably comprise a latch 48 of substantially rectangular shape, having its lateral ends extended through vertical slots 49 in the side members of the lever, the lower edge of the latch being cooperative with the teeth of the rack 26. The latch is provided with an upwardly extending stem 50 connected by means of a rod 51 with the hand grip 52 pivoted near the upper end of the lever. A spring 54 is coiled around the stem so as to rest with its lower end on the upper edge of the latch, and is secured at its upper end to one of the side members of the lever or other convenient part, so as to continuously press the latch downwardly into engagement with the teeth of the rack, from which position it may be withdrawn by grasping the hand grip 52 which operation raises the latch against the compression of the spring.

Means are provided between the pivotal point of the lever and the upper extremity thereof for affording a movable fulcrum about which the lever may be turned, said means preferably comprising a link 55 pivoted at one end to the lever and at the other upon the transverse brace rod 17 extending between the struts 15 or other suitable point relatively fixed with respect to the middle bar. Conveniently, this link may be made of two complementary portions riveted together, slightly spaced apart at their forward ends to engage the side members of the lever and also spaced apart at their rear ends so as to afford a somewhat firmer bearing on the brace rod 17 than might be the case were the link made from a single piece of material, but, if desired, the latter type of link or any other suitable one may be employed.

With the parts constructed and assembled substantially as hereinbefore described, it will be apparent that when the latch is raised out of engagement with the rack, the lever may be moved backward or forward in the vertical plane on the fulcrum afforded by the link 55 to thereby force the sliding member 20 forward or backward on the middle bar and thus change the angularity of the arms 30 with respect thereto to move the side bars 9 and 10 in and out from the middle bar. It will be further apparent that during the movement of the lever, the latter also moves about the center O and that the link 55 rises and falls slightly in a vertical plane about its pivotal center on the brace rod 17 as best shown in Figs. 3 and 4. When the desired adjustment of the side bars is obtained, the latch may be released to engage in one of the teeth of the rack 26 thereby locking all of the parts in rigid adjusted relation and retaining them therein until the latch is again disengaged from the rack and the lever moved to another position to obtain a different adjustment of the side bars.

While I have herein described with considerable particularity a preferred embodiment of my invention I do not thereby desire or intend to limit myself specifically thereto, as modifications and changes may be made in the design, construction and arrangement of the various parts and in their manner of assembly, without departing from the spirit and scope of the invention as defined in the appended claims.

Having thus described my invention, I claim and desire to protect by Letters Patent of the United States:

1. The combination with a cultivator having a middle bar and side bars hingedly secured thereto, of a member slidable on said middle bar and embodying a rack, a single arm connecting said member with each of the side bars, a lever carried by said slidable member and pivotally supported thereon, means carried by said lever and cooperative with said rack to lock said lever and said rack in adjusted relation, slotted guiding means for said arms carried by said middle bar and laterally offset therefrom, and movable means extending between said lever and a point fixed with respect to said middle bar and affording a movable fulcrum for said lever.

2. The combination with a cultivator having a middle bar and side bars hingedly secured thereto, of a member slidable on said middle bar and comprising a pair of complementary members rigidly secured together, a rack carried by said member, a single arm connecting said member with each of the side bars, means operative to maintain each of said arms in a substantially horizontal position, a lever carried by said member, pivotally supported thereon and movable with respect thereto, means carried by said lever and cooperative with said rack to lock said lever and said rack in adjusted relation, means operative to release said locking means, and a link movable with respect to said lever and extending between said lever and a point fixed with respect to said middle bar and affording a fulcrum for said lever.

3. The combination with a cultivator having a middle bar and side bars hingedly secured thereto, of a member slidable on said middle bar and comprising a pair of complementary members rigidly secured together, a rack carried by said member, an arm connecting said member with each of the side bars, a slotted bar laterally offset from and carried by said middle bar adapted to receive said arm to maintain said arm in a horizontal plane, a lever carried by said member and pivotally supported thereon and movable with respect thereto, means carried by said lever and cooperative with said rack to lock said lever and said rack in adjusted relation, means operative to release said locking means, and a link movable with respect to said lever and extending between said lever and a point fixed with respect to said middle bar and affording a fulcrum for said lever.

In witness whereof, I have hereunto set my hand this 28th day of October, 1920.

DAVID R. RICHIE.